US006945348B2

(12) United States Patent
Henderson et al.

(10) Patent No.: US 6,945,348 B2
(45) Date of Patent: Sep. 20, 2005

(54) PEDESTRIAN SAFETY SYSTEM HAVING LOWER LEG IMPACT

(75) Inventors: Jack V. Henderson, West Bloomfield, MI (US); Stephen R. Roddy, Harrison Township, MI (US)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 10/484,861

(22) PCT Filed: Jul. 19, 2002

(86) PCT No.: PCT/CA02/01226

§ 371 (c)(1),
(2), (4) Date: Jan. 23, 2004

(87) PCT Pub. No.: WO03/010029

PCT Pub. Date: Feb. 6, 2003

(65) Prior Publication Data

US 2004/0238256 A1 Dec. 2, 2004

Related U.S. Application Data

(60) Provisional application No. 60/307,812, filed on Jul. 25, 2001.

(51) Int. Cl.⁷ .................................................. B60D 1/28
(52) U.S. Cl. ....................................................... 180/271
(58) Field of Search ................................ 180/271, 274; 280/751; 293/142, 144, 108, 114, 131, 120, 143

(56) References Cited

U.S. PATENT DOCUMENTS

| 1,348,030 | A |   | 7/1920  | Millard            |
|-----------|---|---|---------|--------------------|
| 1,642,233 | A |   | 9/1927  | Sigman             |
| 3,784,244 | A |   | 1/1974  | Emi                |
| 3,831,997 | A |   | 8/1974  | Myers              |
| 3,861,488 | A | * | 1/1975  | Hamada et al. ............. 180/274 |
| 3,913,963 | A |   | 10/1975 | Persicke           |
| 3,961,818 | A |   | 6/1976  | Roth               |
| 3,992,047 | A |   | 11/1976 | Barenyi et al.     |
| 4,076,295 | A |   | 2/1978  | Gutman             |
| 4,093,290 | A |   | 6/1978  | Pearson            |
| 6,113,178 | A |   | 9/2000  | Faigle             |
| 6,193,274 | B1|   | 2/2001  | Brown et al.       |

FOREIGN PATENT DOCUMENTS

JP          11028994 A  *  2/1999   ........... B60R/21/00

* cited by examiner

Primary Examiner—Faye M. Fleming
(74) Attorney, Agent, or Firm—Clark Hill PLC

(57) ABSTRACT

A motor vehicle protection assembly secured to and extending out from a frame of a motor vehicle. The motor vehicle protection assembly absorbs force during an impact of the motor vehicle with another object. The motor vehicle protection assembly includes an attachment bracket fixedly secured to the frame. In addition, the motor vehicle protection assembly includes an impact panel fixedly secured to the attachment bracket and extending between a leading end and a trailing end. The impact panel includes a collapsible region. When the object impacts the leading end, the force created by the impact is absorbed by the collapsible region to reduce the force received and absorbed by the object.

13 Claims, 3 Drawing Sheets

PEDESTRIAN SAFETY SYSTEM HAVING LOWER LEG IMPACT

This application claims the benefit of provisional application No. 60/307,812, filed Jul. 25, 2001.

FIELD OF THE INVENTION

The invention relates to a motor vehicle protection assembly. More particularly, this invention relates to a motor vehicle protection assembly having an impact panel secured to a frame of a motor vehicle for absorbing an impact force.

DESCRIPTION OF RELATED ART

A front end of a motor vehicle protects the motor vehicle and occupants thereof during an impact by absorbing an impact force. More specifically, the front end may be adapted to include structural features for absorbing the impact force. For example, U.S. Pat. No. 3,831,997 to Myers discloses a controlled collapse front end structure for a motor vehicle. A front portion of a body of the motor vehicle includes frame rail members extending forwardly of a passenger compartment. The frame rail members have corrugated metal sections. During an impact, the corrugated metal sections collapse upon themselves to absorb a portion of the energy of the impact.

The front end of the motor vehicle also includes a bumper secured to a motor vehicle frame to absorb force generated by an impact. The bumper is secured to the motor vehicle frame at a predetermined height relative to the ground so that the bumper is available during an impact. This predetermined height can be, however, disadvantageous when the impact is with a pedestrian. This is due to the fact that upon pedestrian impact, the bumper will typically contact the pedestrian just below the knee.

As a result, various devices have been developed to prevent bumper contact with pedestrians. U.S. Pat. No. 4,076,295 to Gutman discloses a pedestrian contact guard for engaging a pedestrian before the pedestrian comes into contact with a bumper. The contact guard includes a bumper securing device, which is rigidly secured to the bumper on opposing transverse sides thereof. A vertical support mechanism permits vertical displacement of the contact guard relative to the bumper. A pedestrian contact device having a tubular member is secured to the vertical support mechanism. The tubular member is positioned forward of the bumper (but still within the contour of bumper guards) so that the tubular member contacts a pedestrian before the bumper.

SUMMARY OF THE INVENTION

A motor vehicle protection assembly is secured to and extends out from a frame of a motor vehicle to absorb force during an impact of the motor vehicle with another object. The motor vehicle protection assembly includes an attachment bracket fixedly secured to the frame. The motor vehicle protection assembly also includes an impact panel fixedly secured to the attachment bracket and extending between a leading end and a trailing end. The impact panel includes a collapsible region such that upon the object impacting the leading end, the force created by the impact is absorbed by the collapsible region to reduce the force created by impact received and absorbed by the object.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
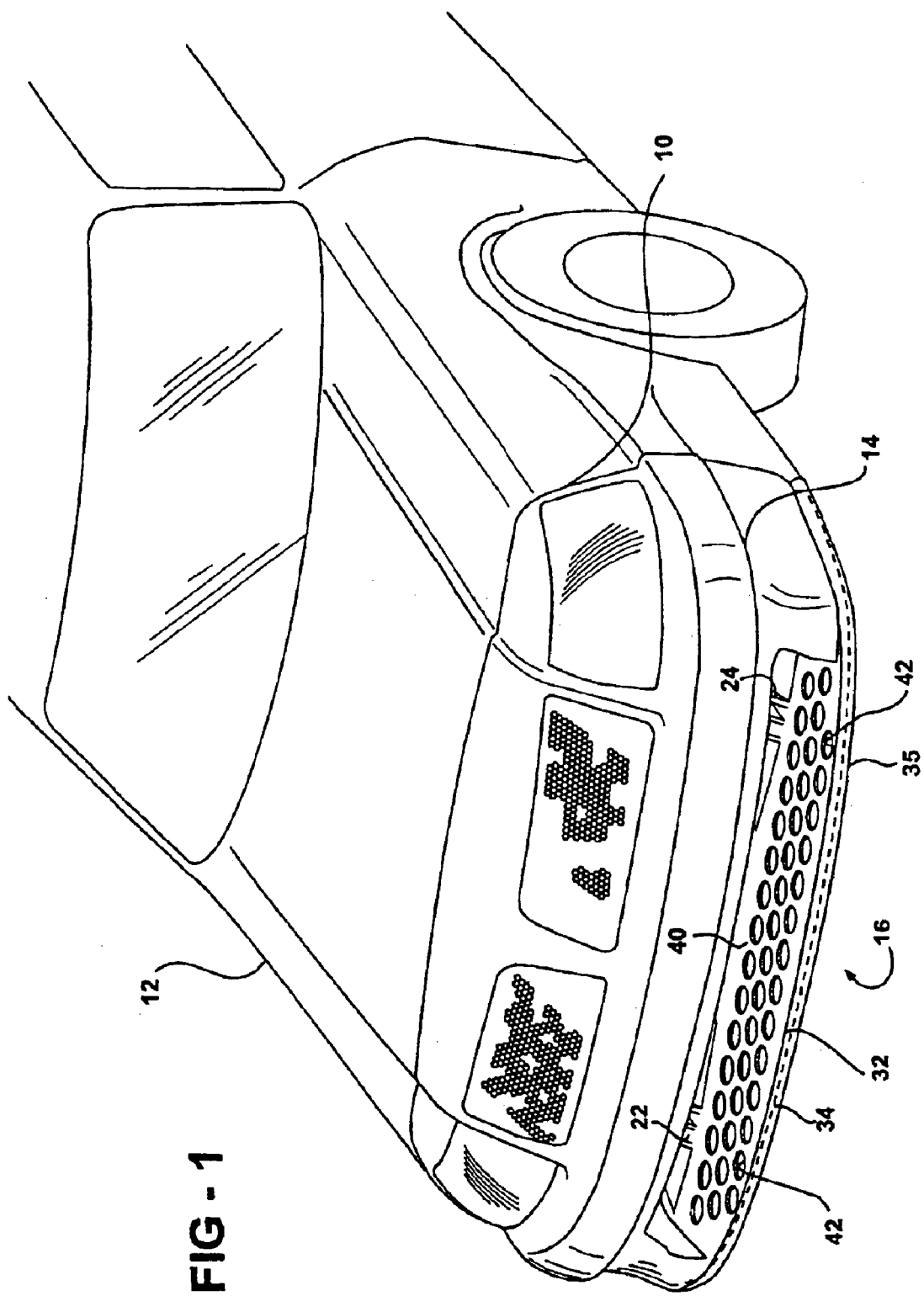
FIG. 1 is a perspective view of a motor vehicle partially cut away incorporating one embodiment of the invention.
Figure 2:
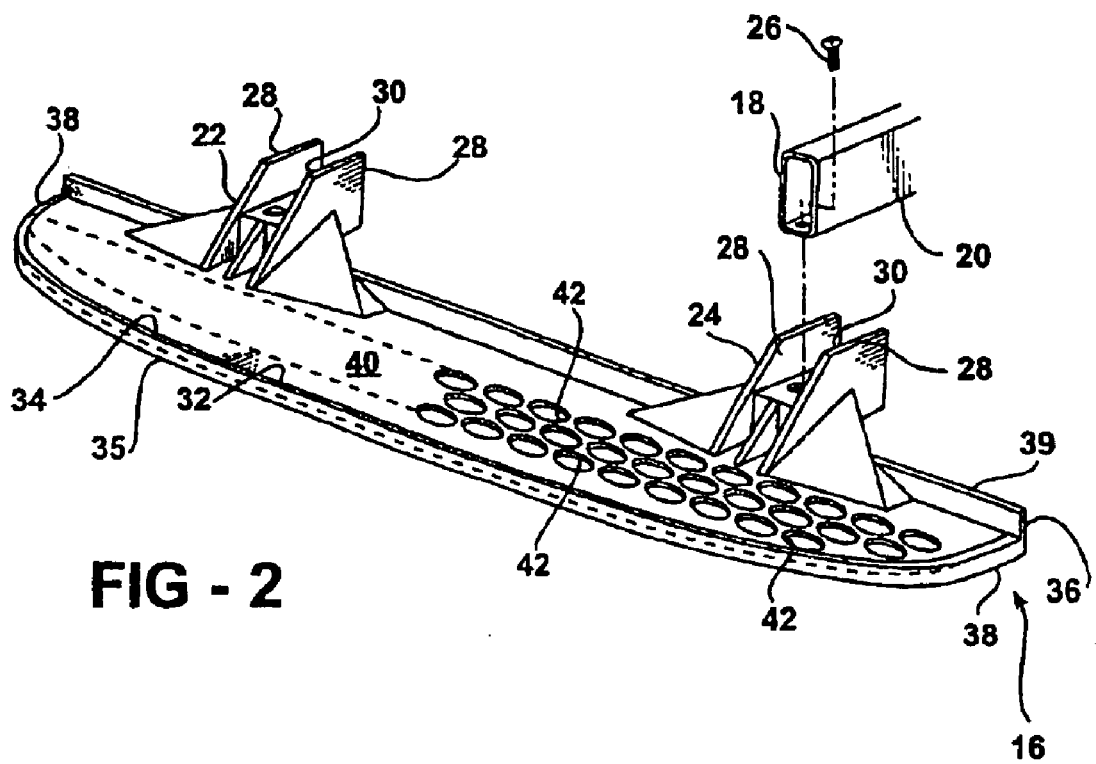
FIG. 2 is a perspective view, partially exploded, of one embodiment of the invention.

Referring to FIGS. 1 and 2, a front end 10 of a motor vehicle 12 includes a front bumper 14 for absorbing an impact force during a motor vehicle impact. A motor vehicle protection assembly, generally indicated at 16, is secured to frame rails 18 of a motor vehicle frame 20. The motor vehicle protection assembly 16 extends out from the motor vehicle frame 20 to a position below the front bumper 14.

The motor vehicle protection assembly 16 includes attachment brackets 22, 24 fixedly secured to the frame rails 18 by fasteners 26. Each of the attachment brackets 22, 24 includes a pair of upright flanges 28 defining a channel 30 therebetween. Each of the frame rails 18 is positioned within the channel 30.

The motor vehicle protection assembly 16 also includes an impact panel 32 fixedly secured to the attachment brackets 22, 24. It will be appreciated that the motor vehicle protection assembly 16 may be manufactured such that the attachment brackets 22, 24 are integrally molded to the impact panel 32. In a preferred embodiment of the invention, the impact panel 32 is planar. The impact panel 32 extends between a leading end 34 and a trailing end 36. The leading end 34 of the impact panel 32 may include an energy-absorbing foam layer 35 extending therealong to provide additional cushioning during impact. It will be appreciated that energy-absorbing layers of other materials similar to foam may be used. A pair of opposing sides 38 interconnects the leading 34 and trailing 36 ends. The impact panel 32 further includes a raised flange 39 extending perpendicularly therefrom at the trailing end 36.

The impact panel 32 defines a collapsible region 40 extending generally between the opposing sides 38. The collapsible region 40 also extends along the impact panel 32 between the leading 36 and trailing 38 ends. The impact panel 32 defines a plurality of apertures 42 formed along the collapsible region 40 thereof. The plurality of apertures 42 may be formed along the entire collapsible region 40, or may be formed along only a portion of the collapsible region 40. In a preferred embodiment, each of the plurality of apertures 42 is oval-shaped. Depending on design preferences, the impact panel 32 may be exposed as part of a fascia (not shown) or the impact panel 32 may be covered by the fascia.

In operation, as the front end 10 of the motor vehicle 12 contacts an object, the leading end 34 of the impact panel 32 will contact the object before the front bumper 14. When the object is a pedestrian, the impact panel 32 will contact a lower part of a pedestian's leg, i.e., away from a knee. This point of impact is preferred to that of the front bumper 14, which would contact a pedestrian at or just below the knee.

As the impact panel 32 contacts the object, the leading end 36 is compressed toward the trailing end 38. At the same time, the plurality of apertures 42 close in upon themselves or cave in and the collapsible region 40 collapses so that the impact panel 32 absorbs much of the impact force created by the collision.

Figure 3:
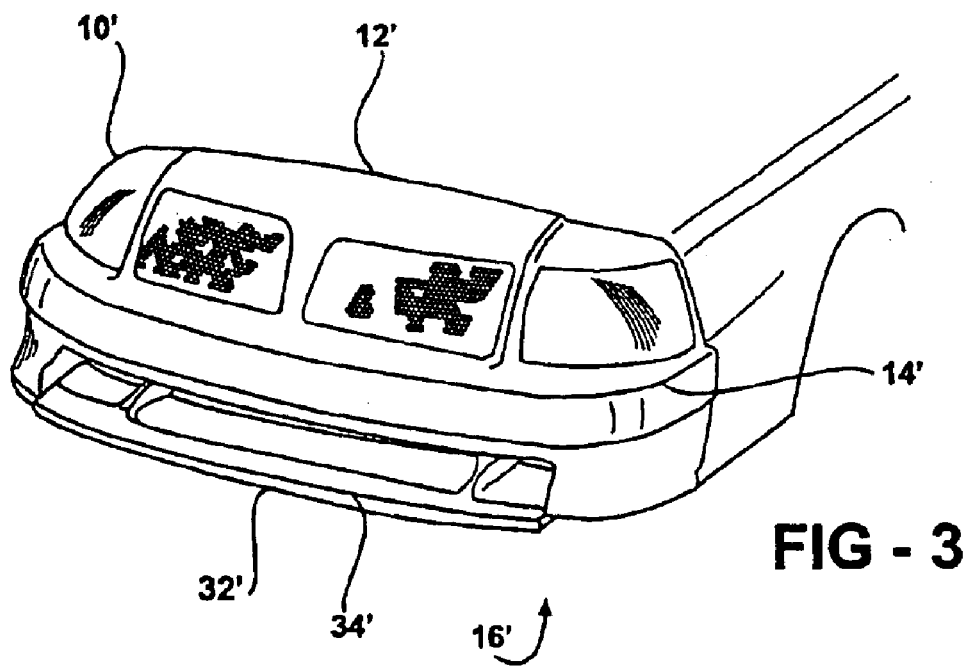
FIG. 3 is a perspective view of a motor vehicle, partially cut away, incorporating a second embodiment of the invention.
Figure 4:
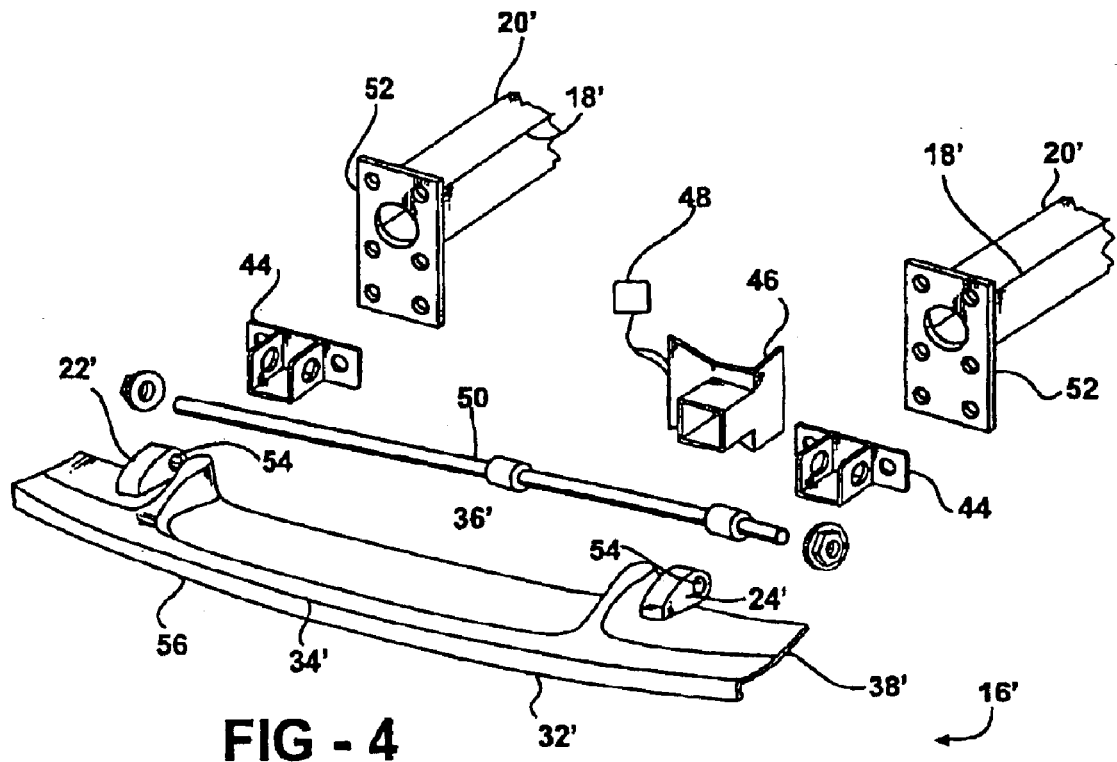
FIG. 4 is an exploded, perspective view of the second embodiment of the invention.
Figure 5:
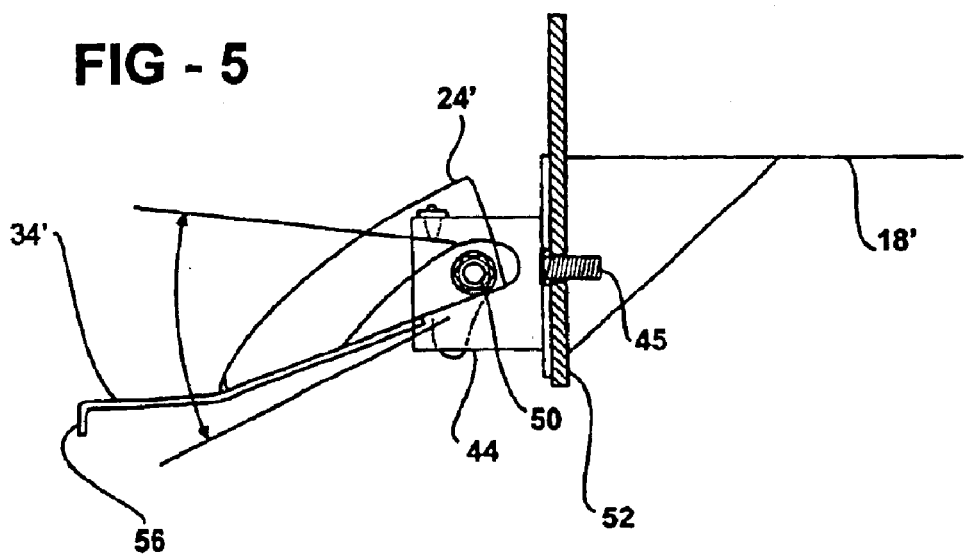
FIG. 5 is a side view of the second embodiment of the invention.

Referring to FIGS. 3 through 5, wherein like primed reference numerals represent similar elements as those described above, a second embodiment of the invention is shown wherein the motor vehicle protection assembly 16' includes a panel mounting bracket 44, the impact panel 32'. The impact panel 32' is secured to the panel mounting bracket 44. The frame rails 18' include a frame mounting bracket 52 secured thereto for attachment of the panel mounting bracket 44 to the frame 20'. A panel fastener 45 secures the panel mounting bracket 44 to the frame mounting bracket 52.

The impact panel 32' includes integrally molded attachment brackets 22', 24', which are disposed adjacent the trailing end 38'. Each of the attachment brackets 22', 24' defines an aperture 54 for securing the impact panel 32' to the panel mounting bracket 44. The impact panel 32' is movable between a raised position and a lowered position. The impact panel 32' includes a contact flange 56 extending downwardly from the leading end 34'.

The motor vehicle 12' includes a speed sensor 48, which creates a speed signal representative of the speed at which the motor vehicle 12' is traveling. The speed sensor 48 sends the speed signal to the motor 46. Depending on the speed signal, the motor 46 moves the impact panel 32' to the raised position or the lowered position A drive shaft 50 pivotally moves the impact panel 32' between the raised and lowered positions upon actuation of the motor 46 in response to the speed signal. A drive fastener 51 secures the drive shaft 50 to the panel mounting bracket 44.

In operation, the speed sensor 48 measures the speed of the motor vehicle 12' and generates a speed signal. When the speed signal indicates a low speed, the motor 46 raises the impact panel 32'. When the impact panel 32' is in the raised position, contact of the impact panel 32' with parking blocks, steep angled approaches, and the like is avoided. As a result, damage to the impact panel 32' is prevented. Generally, the predetermined speed will be 10 miles per hour so that when the motor vehicle 12' is traveling between 0 and 10 miles per hour, the impact panel 32' will be in the raised position.

When the speed sensor 48 measures the speed of the motor vehicle 12' to be above a predetermined speed, the motor 46 moves the impact panel 32' to the lowered position. When the impact panel 32' is in the lowered position, the impact panel 32' will contact the object instead of the front bumper 14'. If the object is a pedestrian, the impact panel 32' will contact the pedestrian at a lower part of a leg, i.e., away from the knee. Consequently, contact of the front bumper 14' to the pedestrian, which generally occurs at or just below the knee, is avoided. Generally, when the motor vehicle 12' is traveling above 10 miles per hour, the impact panel 32' will be in the lowered position, where it is available to absorb an impact force from an impact.

It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A motor vehicle protection assembly secured to and extending out from a frame of a motor vehicle for absorbing force during an impact of the motor vehicle with another object, said motor vehicle protection assembly comprising:
   an attachment bracket fixedly secured to the frame; and
   an impact panel fixedly secured to said attachment bracket and extending between a leading end and a trailing end, said impact panel including a collapsible region such that upon the object impacting said leading end, the force created by the impact is absorbed by said collapsible region reducing the force created by impact received and absorbed by the object, characterized by said impact panel being configured to extend forwardly of said vehicle and below a bumper of said vehicle enabling said impact panel to contact said object before contacting said bumper.

2. A motor vehicle protection assembly as set forth in claim 1 wherein said impact panel defines a plurality of apertures along said collapsible region.

3. A motor vehicle protection assembly as set forth in claim 2 including opposing sides interconnecting said leading and trailing ends.

4. A motor vehicle protection assembly as set forth in claim 3 wherein said collapsible region extends between said opposing sides.

5. A motor vehicle protection assembly as set forth in claim 4 wherein each of said plurality of apertures is oval-shaped.

6. A motor vehicle protection assembly as set forth in claim 5 wherein said leading end includes a foam layer extending therealong.

7. A motor vehicle protection assembly as set forth in claim 1 wherein said impact panel defines a plurality of apertures along a portion of said collapsible region.

8. A motor vehicle protection assembly as set forth in claim 7 wherein each of said plurality of apertures is oval-shaped.

9. A motor vehicle protection assembly secured to and extending out from a frame of a motor vehicle for absorbing force during an impact of the motor vehicle with another object, said motor vehicle protection assembly comprising:
   an attachment bracket fixedly secured to the frame;
   an impact panel fixedly secured to said attachment bracket and extending between a leading end and a trailing end, said impact panel including a collapsible region such that upon the object impacting said leading end, the force created by the impact is absorbed by said collapsible region reducing the force created by impact received and absorbed by the object, characterized by said impact panel being configured to extend forwardly of said vehicle and below a bumper of said vehicle enabling said impact panel to contact said object before contacting said bumper; wherein said impact panel includes a pivot enabling said impact panel to be movable between a raised position and a lowered position; and said assembly further comprises
   a motor fixedly secured to said panel mounting bracket and said impact panel, said motor receiving a speed signal from a speed sensor and driving said impact panel between said raised and lowered positions based on the speed signal.

10. A motor vehicle protection assembly as set forth in claim 9 including a drive shaft pivotally mounting said impact panel.

11. A motor vehicle protection assembly as set forth in claim 10 wherein said impact panel includes integrally molded attachment brackets.

12. A motor vehicle protection assembly as set forth in claim 11 wherein said leading end defines a downwardly extending contact flange.

13. A motor vehicle protection assembly secured to and extending out from a frame of a motor vehicle for absorbing force during an impact of the motor vehicle with another object, said motor vehicle protection assembly comprising:

an attachment bracket fixedly secured to the frame; and an impact panel fixedly secured to said attachment bracket and extending between a leading end and a trailing end and including opposing sides interconnecting said leading and trailing ends, said impact panel including a collapsible region extending between said opposing side and defined by a plurality of oval-shaped apertures such that upon the objecting impacting said leading end, wherein said leading end includes a foam layer extending therealong, the force created by the impact is absorbed by said collapsible region reducing the force created by impact received and absorbed by the object, characterized by said impact panel being configured to extend forwardly of said vehicle and below a bumper of said vehicle enabling said impact panel to contact said object before contacting said bumber.

* * * * *